United States Patent [19]

Johnson

[11] 4,338,724

[45] Jul. 13, 1982

[54] TOOL FOR POSITIONING AND DEFINING HOLES IN WALL PANELS

[76] Inventor: Russell D. Johnson, 2307 W. 14th Ave., Spokane, Wash. 99204

[21] Appl. No.: 155,557

[22] Filed: Jun. 2, 1980

[51] Int. Cl.[3] .......... G01B 3/14

[52] U.S. Cl. .......... 33/174 G; 33/180 R; 33/197; 33/DIG. 10

[58] Field of Search .......... 33/DIG. 10, 180 R, 174 G, 33/189, 197, 191

[56] References Cited

U.S. PATENT DOCUMENTS

| | | | |
|---|---|---|---|
| 2,809,440 | 10/1957 | Schlage | 33/197 |
| 2,862,302 | 12/1958 | Lucia | 33/197 |
| 3,526,947 | 9/1970 | Pasek | 33/189 X |
| 3,745,664 | 7/1973 | Altseimer | 33/DIG. 10 |
| 3,913,235 | 10/1975 | Tenneson et al. | 33/DIG. 10 |
| 4,015,034 | 3/1977 | Smolen | 33/180 R |
| 4,059,905 | 11/1977 | Wieting | 33/DIG. 10 |

*Primary Examiner*—William D. Martin, Jr.
*Attorney, Agent, or Firm*—Keith S. Bergman

[57] ABSTRACT

A series of flat templates, each having a peripheral shape of a hole required in a wall panel, that may be releasably positioned on a utility fixture to be serviced by the hole. The panel facing side of each template is provided with an adhesive so that if a wall panel that is ultimately to define a hole to service a utility fixture is positioned against the template it will releasably adhere to the panel to determine position and configuration of the hole to be established. The template adhesive is of a form that may be reused and replaced.

1 Claim, 8 Drawing Figures

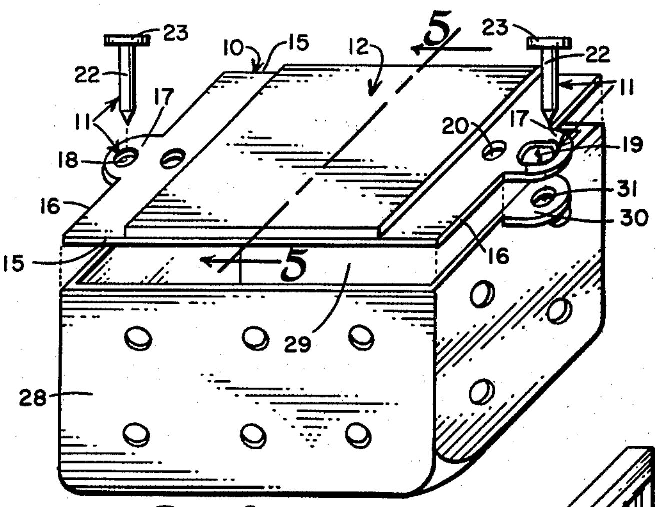
FIG. 4
FIG. 1
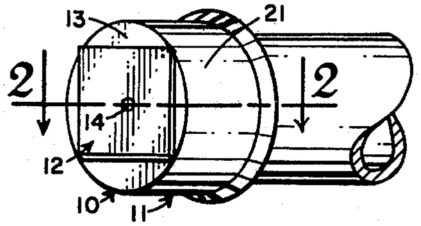
FIG. 2
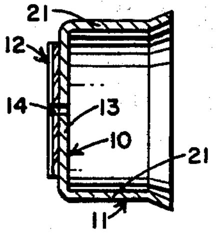
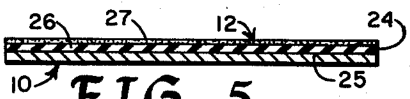
FIG. 5
FIG. 3
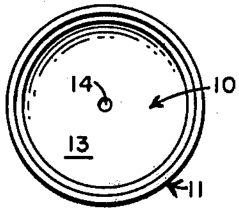
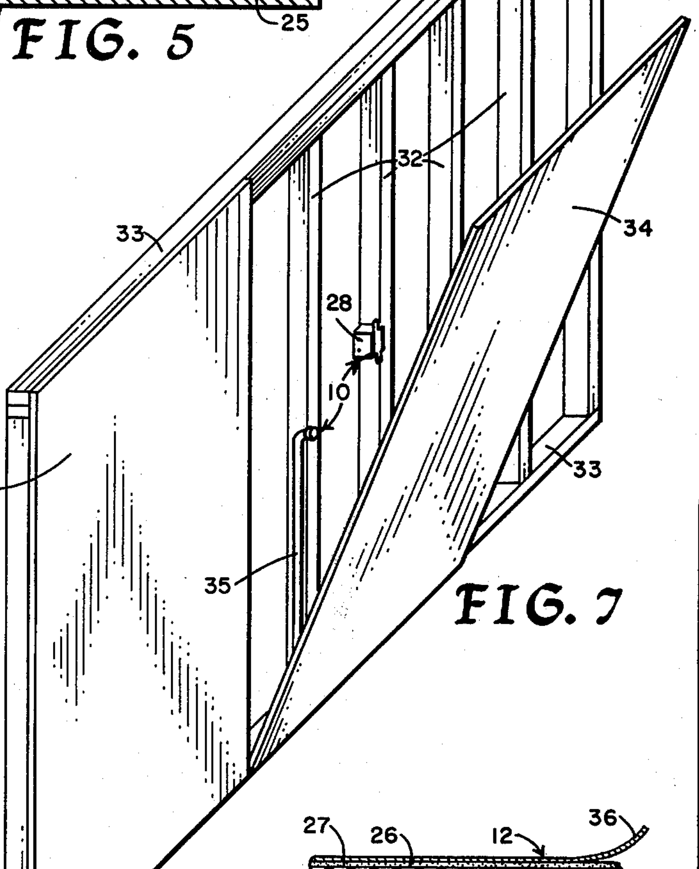
FIG. 7
FIG. 8
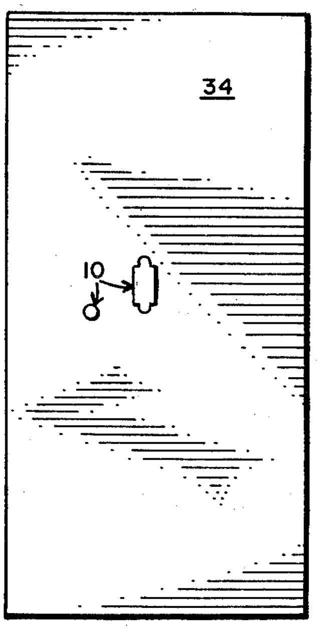
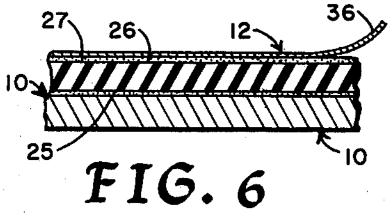
FIG. 6

TOOL FOR POSITIONING AND DEFINING HOLES IN WALL PANELS

BACKGROUND OF INVENTION

Related Applications

There are no applications related hereto heretofore filed in this or any foreign country.

Field of Invention

My invention relates generally to construction tools and more particularly to releasably positionable templates to determine position and peripheral configuration of holes in wall panels.

Description of Prior Art

In the construction industry generally and in light frame type construction of the present day particularly, interior wall surfaces are commonly formed of panels of some area and relative thinness such as so called 'drywall', plaster board, plywood, pressed fiber or plastic panels. Commonly these panels are supported on the surface of framework of some thickness formed of vertical studs and horizontal lintels, beams and plates. The panels usually are of some substantial areal extent to best serve construction economics and because of their area it is often required that various orifices be cut in such panels. Larger orifices as for window and door openings are not generally too great a construction problem as their shape is usually rectilinear and the peripheral elements of the orifices usually are parallel to the peripheral elements of the panel. The location and peripheral definition of smaller holes for utility services such as pipe openings and electrical fixture openings is, however, a more difficult problem because these holes generally are fairly randomly located over the medial portion of a panel and have relatively small, oftentimes irregular peripheral shapes. The holes also generally must be quite accurately defined both in configuration and location as fixtures or coverplates associated therewith commonly do not allow for much error and if a hole in a wall panel is not covered by a fixture or coverplate, it provides a most unsightly unworkmanlike appearance that generally cannot be effectively remedied by secondary patching.

This problem has heretofore been recognized and various devices have become known both to locate and to define the periphery of holes for utility fixtures to be formed in wall panels. None of these prior art devices, however, seem to have come in to common use in the construction industry to serve the purposes intended for them.

Since commonly in ordinary light frame construction utility service is provided for in wall framing structures, it must be placed before placement of wall covering panels and because of this utility service fixtures may serve as an effective means of positioning templates to determine the position of holes to be defined in adjacent wall panels to service such fixtures.

One class of prior art devices provides a tool which may be releasably positioned over a rough utility service fixture, such as the end of a pipe or an electric junction box, and positionally maintained while a wall panel is positioned thereover. Such tools have some associated means of marking on the back of a wall panel placed thereagainst either the periphery of a hole to be defined in the panel or some other definitive geometrical characteristic of it such as the center of a circular hole. Commonly such marking has been accomplished by prongs that project into the back of a wall panel or in at least one case by a projection that is covered with an ink-like compound to mark a hole periphery on the back of a panel. Either of such devices, since they have parts of relatively small surface area projecting outwardly toward and contacting the back of a wall panel, are of a delicate nature, quite subject to damage which may render them ineffective and of a relatively short effective life. The prong type devices are particularly prone to prong bending as usually some substantial force must be exerted on a wall panel to cause prongs to mark the back of a panel. The ink marking type of device generally provides a marker of rubber or similar material which is not particularly physically durable and in addition this type of device requires ancillary supplies and constant preparation. My invention is readily distinguishable from this class of tool in that it does not directly mark either the periphery or any other measuration information for a hole on the back of a wall panel, but rather transfers and temporarily adheres a template to the wall panel so that hole position and periphery may be subsequently manually marked by a workman.

A subclass of this art, providing adhesive maintenance on a utility fixture and subsequent transfer of some sort of a template has also heretofore become known, especially as shown in U.S. Pat. No. 3,526,947 heretofore issued on Sept. 8, 1970 to Pasek. The Pasek device shows the temporary adhesion of a template to locate and define the periphery of holes to be established in wall panels. This device, however, uses two opposed adhesive surfaces on each side of a sheet-like template, one to adhere the template to the underlying rough utility fixture and the other to adhere the template to the back side of a wall panel. The operation of this type of device depends upon deferential adhesive powers between the two actively operative adhesive surfaces. Because of this if such a device be operative at all, it is only with great difficulty that the degree of adhesion of the two adhesive surfaces may be regulated or differentiated. The instant invention in contradistinction positions and temporarily removably maintains a template on an underlying rough utility fixture by mechanical means and uses an operative adhesive surface only to releasably attach the template to the inner surface of a wall panel. This difference in the manner in which the template is releasably maintained on the rough fixture provides a substantially greater factor of operability and dependability for the instant invention and distinguishes it both structurally and functionally from the Pasek subclass of device.

SUMMARY OF INVENTION

My invention generally provides templates that may be releasably positioned by mechanical means on rough utility fixtures to be subsequently transferred to the back of a wall panel and there releasably maintained by adhesive means to determine position and configuration of a hole to be defined in such wall panel to service such rough utility fixtures.

My templates to locate circulate pipe holes comprise flat, circular caps having perpendicular side walls extending therefrom to define a chamber very slightly larger than the pipe to be serviced so that the cap may be slidably placed over the end of that pipe. The outer surface of the cap portion is provided with a pressure sensitive adhesive material so that when contacted by a wall panel the cap will adhere to that wall panel to allow determination of both configuration and position of a pipe hole to be defined therein. A small medial hole is defined in the cap at its center to aid the mechanical process of establishing a pipe hole in a panel.

My template to define a hole to service an electric junction box constitutes a flat template, the periphery of which defines the shape of the hole desired. The template has at least two holes defined in it to coincide with similar fastener holes provided by the junction box to accept two nail-like fasteners therebetween to releasably and positionally maintain the template on the outwardly facing surface of the junction box. The outwardly (panel facing) surface of the template is provided with a pressure sensitive adhesive material of some areal extent to releasably adhere the template to the back of a wall panel when pressed thereagainst, again to positionally and peripherally define a hole required to be created in the wall panel to service the particular junction box.

The adhesive surface on my templates is provided by a resilient tape of some thickness to aid and assure adhesion of the templates to the surface of a wall panel pressed thereagainst.

In creating such devices it is:

A principal object of my invention to provide templates that may be releasably positioned by mechanical means on rough utility fixtures to be thereafter transferred and releasably adhered to a surface of a wall panel covering the wall about such utility fixtures to both positionally and peripherally define holes in such a wall panel required to service such fixtures.

A further object of my invention to provide such templates that have a reuseable adhesive element of some thickness and resiliency on their panel facing side to assure adhesion and provide for replacability.

A still further object of my invention to provide a method of using my templates to positionally and peripherally define holes required in wall panels to allow passage of pipes and for electrical fixtures.

A still further object of my invention to provide such templates that are of new and novel design, of rugged and durable nature, of simple and economic manufacture, and otherwise well suited for the uses and purposes for which they are intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric view of a pipe template of my invention, in operative position on the end of a pipe, to show its parts, their configuration and relationship.

FIG. 2 is a horizontal cross-sectional view of the pipe template of FIG. 1 taken on the line 2—2 thereon in the direction indicated by the arrows.

FIG. 3 is an orthographic end view of the pipe template of FIG. 1 taken as from the right side of FIG. 1.

FIG. 4 is an expanded isometric view of electrical junction box template showing its parts, their configuration and relationship and the method of releasably positioning it on the surface of a junction box.

FIG. 5 is a vertical, medial cross-sectional view of the junction box template of FIG. 4 taken on the line 5—5 thereon in the direction indicated by the arrows.

FIG. 6 is an enlarged, somewhat idealized view of a portion of the cross-section of FIG. 5 showing the details of the adhesive tape used with my invention.

FIG. 7 is an isometric view of a typical stud wall of light frame construction with a pipe and electrical junction box roughed in, my templates releasably positioned thereon and a panel being applied thereover to illustrate the method of use of my invention.

FIG. 8 is an orthographic view of the back or wall facing side of the panel being applied in FIG. 7 after my templates have been adhered thereto to show how the templates peripherally and positionally determine holes to be defined in the panel.

DESCRIPTION OF THE PREFERRED EMBODIMENT

My invention provides generally one or more templates 10 each having mechanical means 11 to releasably position them on a utility fixture and adhesive means 12 to releasably fasten them to a wall panel.

Template 10 illustrated in FIG. 1 is to aid in defining circular holes for pipes. In this case the template comprises flat, disk-like cap 13 of the same shape as but slightly larger than the cross-section of a pipe to be serviced. Commonly though not necessarily this cross-sectional shape will be circular. Mechanical means 11 to releasably maintain the template on a pipe comprise cylindrical skirt 21 extending substantially perpendicularly from the periphery of cap 13. This cylindrical skirt is so dimensioned that its internal diameter is very slightly greater than the external diameter of a pipe to be serviced so that it may be readily placed and maintained thereon and removed therefrom. To aid placement the edge of the skirt most distal from cap 13 might be flared slightly, if desired. The skirt and cap are mechanically joined by some appropriate fastening means of appropriate strength and durability or more conveniently may be press-formed, from a unitary material such as sheet metal, to the shapes and dimensions specified. Preferably but not necessarily relatively small center hole 14 is defined about the geometrical center of cap 13 to aid in locating that center when the cap be adhered to a panel.

A template is created for each different size of pipe for which a hole is to be created so that the template may be properly positioned and maintained upon a pipe to appropriately define the hole to be created for it as hereinafter provided.

Adhesive means of fastening a template to a panel comprise tape body 24 of some areal extent having template facing surface 25, in the instance illustrated adhesively coated to fasten to the template, and a panel facing surface 26 coated with adhesive 27 to releasably adhere to the surface of a panel in which holes are to be defined. Tape body 24 preferably is of some thickness and resilience to aid in adhesively fastening a template to a panel surface. Adhesive 27 should be such as to releasably fasten a template to a panel surface and positionally maintain it for some appropriate period of time, yet provide release upon appropriate manipulation. I have found a typical rubber based contact cement of commerce to be quite appropriate for this purpose though undoubtedly other commercial adhesives will permit reuse and this generally will require that the adhesive bond be not greater than necessary or else debris from the panel surface or elsewhere will be retained by the adhesive to prevent its prolonged reuse. Similarly if template facing surface 25 of tape body 24 be fastened to the template by adhesive means, this adhesive bond must be stronger than that formed by adhesive 27 and the surface of a wall panel or else upon manipulation tape body 24 may separate from the template rather than from the panel.

I have found that a simple and convenient method of regulating adhesive bond strength is to use a pebble or undulating surface on tape body 24. The size and distribution of the protuberances of a pebbled surface will determine the areal proportion of the surface in adhesive contact with an adjacent surface and by regulating the area of adhesive contact the total strength of the adhesive bond may be regulated. A tape body having a smooth template facing surface 25 and pebbled panel facing surface 26 may have the same adhesive applied to both surfaces and fulfill its purpose as the smooth surface will have more adhesive contact area and thusly a stronger bond with a template than the panel facing surface will have with a wall panel surface. Again the total strength of the adhesive bond on either side of tape body 24 may be regulated by the areal extent of the tape body and this should be determined in relationship with the other adhesive parameters so that a template will adhere sufficiently to a panel surface to be positionally maintained for a period of time but yet may be readily released therefrom by ordinary manual manipulation, requiring force of no more than a few pounds. Various commercial tapes of modern commerce are available to serve the purposes of my invention.

It should be noted, though not illustrated, that tape body 24 may be mechanically fastened to template 10 by known means such as riveting, stapling, framing or the like, and if this be done, no problem concerning differential adhesive strength is encountered.

A template 10 for use in defining a hole for an electrical junction box is shown particularly in FIGS. 4 and 5. Here the template comprises a flat, rigid sheet of somewhat rectilinear configuration having similar sides 15 and ends 16 with normally projecting ears 17 in the medial portion of each end, all configured and dimensioned to define a periphery substantially coincident with opening 29 of electrical junction box 28 for which a hole is to be created. This template may be formed from any suitably rigid and durable material to the peripheral shape illustrated, but I prefer rolled aluminum sheet of approximately twenty gauge thickness. Junction box 28 customarily provides fastening ears 30 projection from its ends, each of which defines fastening hole 31 therein to aid in fastening a finishing electrical fixture in the junction box. My junction box template provides fastening hole 18 in one fastening ear so configured and positioned as to coincide with fastening hole 31 in the underlying fastening ears 30 of the junction box. Slot 19 is defined in the other fastening ear with width the same as the diameter of fastening hole 18, positioning such that the other fastening hole 31 may be coincident within the slot, and a length such as to extend some slight distance on both sides of fastening hole 31 in a direction parallel to the sides 15 of the template, all to allow fastening of a template on junction boxes having some irregular spacing of fastening holes 31. Two circular alignment holes the same size as fastening hole 18 are provided in the body of the junction box template somewhat inwardly of fastening hole 18 and slot 19 with their centers on a line extending therebetween. These alignment holes allow transference of the template from the back to the front side of a panel in which holes are to be defined should this be required.

Mechanical means 11 to releasably position an electrical junction box template on a junction box comprise two cylindrical pins or nails 22 having heads 23 at one end. The nails have a diameter very slightly less than the diameter of fastening hole 18 so that template fastening hole 18 and slot 19 can be placed over fastening holes 31 of junction box 28 and the two nails inserted through each cooperating pair of fastening holes to releasably position and maintain the template on the surface of junction box 28.

Adhesive means 12 to fasten a junction box template to a wall panel comprise the same adhesively coated tape body 24 previously described for use with the pipe template. In the case of the junction box template, however, it may be necessary or desirable that tape body 24 have some greater areal measure than the tape body required for the pipe template. The method of adhesion and fastening, however, is identically the same as described for the pipe template.

Again with the use of electrical junction box templates, a separate template must be formed for each junction box of different size or peripheral configuration. Generally the size and dimensions of such junction boxes are reasonably standardized and normally only three or four different boxes are commonly used in ordinary light frame construction. Each template, however, must be substantially identical in peripheral configuration to the orifice of the junction box it is to service.

Having thusly described the structure of my invention its operation now may be readily understood, particularly with reference to FIGS. 7 and 8 of the drawings.

FIG. 7 shows a section of a common type of wall of light frame construction formed by vertical studs 32 and horizontal plates 33. Such a wall is commonly surfaced on both sides with flat sheet-like wall panels 34 positionally maintained by mechanical fastening as by gluing or nailing on the studs and plates. Utility service such as for plumbing and electricity is commonly provided in the wall structure between panels 34. A pipe 35 and electrical junction box 28 for which holes are to be created in wall panel **34*a* are shown in the wall structure. Commonly in present day construction procedure a wall will be framed with studs 32 and plates 33, pipe 35 and junction box 28 will then be installed and thereafter wall panels 34 installed. The end portion of pipe 35 will be substantially coplanar with the surface of the studs and plates and thusly with the inner surface of wall panel 34*a*. Junction box 28 will be similarly placed so that the periphery defining its orifice will be in substantially the same plane. With the wall structure in this condition as illustrated in FIG. 7, my pipe template is positioned over the end of pipe 35 and my junction box template is positioned over junction box 28 by inserting nails 22 simultaneously through fastening hole 18 and slot 19 in the template and fastening holes 31 in the junction box. In this condition then panel 34*a*, which has previously been cut to appropriate peripheral dimension, is properly positioned against the surface of the studs and plate preferably by firstly placing the bottom and thence tipping the panel into proper final position as illustrated. When this is done, the inside surface of panel 34 will come into contact with adhesive means 12 of both templates and when this occurs, since adhesive 27 on panel facing surface 26 of tape body 24 is a contact type adhesive, the templates will be adhered to the inside surface of the panel. The panel is then removed from the stud wall and since the templates are only releasably maintained by pipe 35 and junction box 28, they will be removed from their supporting rough fixtures as the panel is removed and will be releasably maintained on the panel. These templates will then both positionally and peripherally define a hole that need be established in panel 34***a* to allow passage of pipe 35 or an interconnecting pipe through the panel and allow installation of finishing electrical fixtures in junction box 28.

With templates in this condition then a mechanic need merely trace about the periphery of the templates to define the periphery of the required holes in proper position on a panel. Holes may then be defined in the panel by customary means of so doing heretofore known. Commonly a pipe hole will be created by a drill or circular saw and commonly the junction box hole will be cut by knife or saw of some sort. If a drill be used to establish a pipe hole, center hole 14 of a pipe template will conveniently establish the center of the hole so that a drill may be properly aligned at the inception of its use. After my templates have served their purpose as aforesaid, they may be readily removed from a panel surface by manual manipulation and they are again ready for reuse.

It is to be noted that the templates when used as described will define both periphery and position of a hole in the obverse or inwardly facing side of a wall panel. Sometimes it is desirable or necessary that a hole be similarly defined on the face or outwardly facing side of a wall panel. This can be accomplished with the pipe template by driving nail 22 through center hole 14 in this template and thence through panel 34. The template then can be removed from the obverse side of the panel and placed on the front side to be repositioned by inserting the nail again through center hole 14 and through the existing hole in the wall panel. The junction box template may be similarly transferred to the front surface of a wall panel by inserting two nails through alignment holes 20 in the template and through a wall panel and then repositioning the template on the front side of the wall panel again by aligning it with the then existing holes in the wall panel. It is commonly necessary to cut holes in wooden faced and plywood paneling from the face side to prevent splintering or other damage during the hole cutting operation.

It is to be particularly noted from the foregoing description that a single template may be reused a number of times. Eventually, however, adhesive 27 on panel facing surface 26 of tape body 24 will become debilitated by contamination, removal or otherwise until it will not properly adhere to a panel. When this occurs, tape body 24 may be replaced to allow continued use of the same template. To prevent contamination of the adhesive 27 a protective covering such as a sheet of smooth waxed paper 36 may be applied to the adhesive surface when not in use.

The foregoing description of my invention is necessarily of a detailed nature so that a specific embodiment of it might be set forth as required, but it is to be understood that various modifications of detail, rearrangement and multiplication of parts may be resorted to without departing from its spirit, essence or scope.

Having thusly described my invention, what I desire to protect by Letters Patent, and what I claim is:

1. A tool to positionally define the periphery of holes to be created in wall panels to service rough utility fixtures that are positioned in wall support frames with orifices substantially coplanar with the surface of such support, frames comprising, in combination:

a rigid planar template configured with a peripheral shape substantially the same as that of an electrical junction box for which a hole is to be established;

mechanical means associated with the template to releasably maintain it on a rough utility fixture in position to define the periphery of a hole to be cut in a surrounding wall panel to service such electrical junction box comprising two fastening holes defined in the template to be coincident with two similar fastening holes in the junction box and two headed nails extending between cooperating fastening holes in the junction box and template respectively; and adhesive means, on the panel facing side of the template to releasably position and maintain it on the surface of a wall panel in which a hole is to be defined, comprising, a resilient tape body of some thickness structurally fastened to the template and having adhesive on its exposed surface.

* * * * *